(12) United States Patent
Amici et al.

(10) Patent No.: US 9,156,958 B2
(45) Date of Patent: Oct. 13, 2015

(54) THERMOPLASTIC POLYMER COMPOSITION CONTAINING POLYAMIDE

(75) Inventors: Marco Amici, Paruzzaro (IT); Cesare Guaita, Tradate (IT)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

(21) Appl. No.: 13/130,788

(22) PCT Filed: Nov. 24, 2009

(86) PCT No.: PCT/EP2009/065726
§ 371 (c)(1),
(2), (4) Date: Jan. 23, 2012

(87) PCT Pub. No.: WO2010/058024
PCT Pub. Date: May 27, 2010

(65) Prior Publication Data
US 2012/0136103 A1 May 31, 2012

(30) Foreign Application Priority Data

Nov. 24, 2008 (FR) ...................... 08 06578

(51) Int. Cl.
*C08G 69/26* (2006.01)
*C08L 77/00* (2006.01)
*C08J 5/08* (2006.01)
*C08L 77/06* (2006.01)
*C08K 7/14* (2006.01)
*C08L 77/02* (2006.01)

(52) U.S. Cl.
CPC .. *C08J 5/08* (2013.01); *C08L 77/06* (2013.01); *C08J 2377/06* (2013.01); *C08K 7/14* (2013.01); *C08L 77/02* (2013.01); *C08L 2205/02* (2013.01)

(58) Field of Classification Search
None
See application file for complete search history.

(56) References Cited

U.S. PATENT DOCUMENTS 4,062,819 A * 12/1977 Mains et al. ............... 525/420.5

FOREIGN PATENT DOCUMENTS

| EP | 0355547 A | 2/1990 |
|---|---|---|
| FR | 2913023 A | 8/2008 |
| WO | WO 99/36610 | * 7/1999 |

* cited by examiner

Primary Examiner — Susannah Chung
Assistant Examiner — Robert T Butcher
(74) Attorney, Agent, or Firm — Dentons US LLP

(57) ABSTRACT

The invention relates to a thermoplastic polymer composition that contains polyamide and comprises an excellent compromise of properties, in particular mechanical properties, and a high fluidity at the molten state. The invention particularly relates to a composition containing at least a high-fluidity linear polyamide and optionally fillers such as glass fibers, and to a method for making such a composition.

12 Claims, No Drawings

THERMOPLASTIC POLYMER COMPOSITION CONTAINING POLYAMIDE

CROSS-REFERENCE TO PRIOR APPLICATIONS

This application is the United States national phase of PCT/EP2009/065726, filed Nov. 24, 2009, and designating the United States (published in the French language on May 27, 2010, as WO 2010/058024 A1; the title and abstract were also published in French) and claims priority under 35 U.S.C. §119 of FR 0806578, filed Nov. 24, 2008, each hereby expressly incorporated by reference in its entirety and each assigned to the assignee hereof.

The present invention relates to a polyamide-based thermoplastic polymer composition that exhibits an excellent balance between its properties, in particular its mechanical properties, and a high melt flow. The invention relates in particular to a composition comprising at least one high-fluidity linear polyamide and optionally fillers, such as glass fibers; and also to a process for the production of such a composition.

PRIOR ART

Among the properties that it is often desired to control in the case of a thermoplastic intended to be formed by techniques such as injection molding, gas-injection molding, extrusion and extrusion-blow molding, mention is made of stiffness, impact strength, dimensional stability, in particular at a relatively high temperature, low post-forming shrinkage, a capacity for coating by various processes, surface appearance and density. These properties can be controlled, within certain limits, through the choice of a polymer or through the addition to the polymer of compounds of various natures. In the latter case, the term polymeric compositions is used. The choice of a material for a given application is generally guided by the required level of performance with respect to certain properties and by its cost. Polyamide is, for example, a material that is widely used, in particular in the sector of the automotive industry. The aim is always to obtain new materials that can meet a specification in terms of performance and/or cost.

The aim is in particular to obtain polyamide compositions which exhibit an excellent balance between melt flow, so that they can be easily used during processing, and mechanical properties, thus allowing the preparation of articles which are in particular impact resistant.

INVENTION

The applicant has demonstrated polyamide compositions that exhibit an increased melt flow and equivalent or superior mechanical properties, in comparison with conventional polyamide compositions, and that make possible the preparation of articles having an excellent surface appearance. It also appears that these compositions are easy to use in forming processes of interest, in particular injection molding with accelerated cycle times.

The subject of the invention is thus a composition obtained by blending at least:
a) a (co)polyamide a) of type 66 having an Mn of between 8000 and 18 000 g/mol;
b) 5% to 20% by weight of (co)polyamide b) of type 6, relative to the total weight of the blend of (co)polyamide a) and (co)polyamide b), said (co)polyamide b) having an Mn of between 18 000 and 40 000 g/mol; and
c) 0% to 90% by weight, relative to the total weight of the composition, of reinforcing fillers;
the ratio of the viscosities in solution, measured according to Standard ISO 307 in formic acid, of the (co)polyamide a) relative to the (co)polyamide b) being between 0.3 and 0.8;
said composition having an apparent melt viscosity, in Pa·s, according to the following relationships:

$$\eta 100 \leq 8(X) + 100$$

$$\eta 1000 \leq 3(X) + 90$$

in which η is the apparent melt viscosity of the polyamide composition measured at a temperature of 275° C.; either at a shear rate of 100 s$^{-1}$, η100, or at a shear rate of 1000 s$^{-1}$, η1000; and X corresponds to the proportion by weight of reinforcing fillers, relative to the total weight of the composition.

The composition preferentially comprises a polyamide matrix consisting only of the (co)polyamides a) and b).

DEFINITIONS

The number-average molecular weight Mn is defined according to the following formula:

$$M_n = \frac{\sum_i n_i M_i}{\sum_i n_i}$$

where $n_i$ is the number of molecules with corresponding molecular weight $M_i$.

The absolute Mn value can be measured by size exclusion chromatography (SEC), coupled with light diffraction, or calculated on the basis of analysis of the end groups using the procedure detailed in the Nylon Plastics Handbook, written by Melvin I. Kohan, Hanser Publisher, 1995, pages 42 et seq., and page 78 et seq.

The viscosity in solution can be measured according to Standard ISO 307, in a solution of formic acid, with a concentration of 5 grams per liter, at a temperature of 25° C., using a Schott AVS 360 viscometer.

The apparent melt viscosity of the polyamide composition according to the present invention can be measured according to Standard ISO 11443, in particular using a Göttfert Rheograph 2002 capillary rheometer. It is, for example, possible to use a capillary 30 mm in length and 1 mm in diameter, with a piston having a diameter of 12 mm; and, for example, to carry out the measurement with samples having a residual moisture content equal to the steady-state water content of each polyamide.

DETAILED INVENTION

The (co)polyamide a) is a thermoplastic polyamide of type 66, i.e. a polyamide obtained at least from adipic acid and hexamethylenediamine or their salt, such as hexamethylenediamine adipate, which may optionally comprise other polyamide monomers.

The term "(co)polyamide of type 66" is intended in particular to mean a (co)polyamide comprising at least 80 mol %, preferentially at least 90 mol % of adipic acid and hexamethylenediamine monomer residues.

The (co)polyamide a) according to the invention has an Mn of between 8000 and 18 000 g/mol, preferentially between 10 000 and 16 000 g/mol and more preferentially between 12 000 and 15 000 g/mol.

The polymerization of the polyamide of the invention is in particular carried out according to the conventional operating conditions for the polymerization of polyamides, continuously or batchwise.

Such a polymerization process may comprise, briefly:
heating the blend of monomers and multifunctional (i) and monofunctional (ii) compounds, with stirring and under pressure,
holding the blend under pressure and temperature for a given period of time, with removal of water vapor via a suitable device, then decompression and holding for a given period of time at a temperature above the melting point of the blend, in particular under autogenous pressure of water vapor, under nitrogen or under vacuum, in order to thus continue the polymerization by removal of the water formed.

At the end of polymerization, the polymer can be cooled, advantageously with water, and extruded in the form of rods. These rods are cut up in order to produce granules.

According to the invention, the polyamide may be produced by addition during polymerization, in particular at the start of polymerization, of the polyamide 66 monomers, additionally in the presence of difunctional and/or monofunctional compounds. These difunctional and/or monofunctional compounds have amine or carboxylic acid functions capable of reacting with the monomers of the polyamide. The difunctional compounds may have the same amine or carboxylic acid functionality. The amine functions may be primary and/or secondary amine functions. The (co)polyamide a) of the invention may have a linear or branched structure.

The difunctional and/or monofunctional compounds used are agents that modify the chain length of the polyamides and make it possible in particular to obtain polyamides that have a melt flow index greater than or equal to 10 g/10 min. according to Standard ISO 1133 measured at a temperature of 275° C. with a load of 325 g, preferentially between 10 and 50 g/10 min., more preferentially between 15 and 50 g/10 min., and even more preferentially between 20 and 40 g/10 min.

It is possible to use, at the start of, during or at the end of the polymerization, all types of aliphatic or aromatic monocarboxylic or dicarboxylic acids, or all types of aliphatic or aromatic monoamine or diamine amines. Use may in particular be made, as a monofunctional compound, of n-dodecylamine and 4-amino-2,2,6,6-tetramethylpiperidine, acetic acid, lauric acid, benzylamine, benzoic acid and propionic acid. Use may in particular be made, as a difunctional compound, of adipic acid, terephthalic acid, isophthalic acid, sebacic acid, azelaic acid, dodecanedioic acid, decanedioic acid, pimelic acid, suberic acid, fatty acid dimers, di(β-ethylcarboxy)cyclohexanone, hexamethylenediamine, 5-methylpentamethylenediamine, meta-xylylenediamine, butanediamine, isophoronediamine, 1,4-diaminocyclohexane and 3,3',5-trimethylhexa-methylenediamine.

It is also possible to use an excess of adipic acid or an excess of hexamethylenediamine for the production of a polyamide of type 66 having a high melt flow.

Preferentially, the proportion of terminal acid groups is different than the proportion of terminal amine groups, in particular at least two times higher or lower. The amounts of terminal amine groups (TAG) and/or terminal acid groups (TCG) are determined by potentiometric assays after dissolution of the polyamide.

The (co)polyamide b) is a thermoplastic polyamide of type 6, i.e. of polyamide obtained at least from caprolactam, which may optionally comprise other polyamide monomers.

The term "(co)polyamide b) of type 6" is in particular intended to mean a (co)polyamide comprising at least 80 mol %, preferentially at least 90 mol % of caprolactam monomer residues.

The (co)polyamide b) according to the invention has an Mn of between 18 000 and 40 000 g/mol, preferentially between 25 000 and 30 000 g/mol.

The (co)polyamide b) can be obtained in particular by addition during polymerization, in addition to the caprolactam, of the difunctional and/or monofunctional compounds mentioned above. The (co)polyamide b) of the invention can have a linear or branched structure.

The ratio of the viscosities in solution, measured according to Standard ISO 307 in formic acid, of the (co)polyamide a) relative to the (co)polyamide b) is preferentially between 0.5 and 0.6.

As reinforcing filler c), mention may in particular be made of those selected from the group consisting of fibrous fillers, such as glass fibers, carbon fibers, natural fibers or nanotubes, and/or non-fibrous fillers. As natural fibers, mention may be made of hemp and flax. Among the non-fibrous fillers, mention may in particular be made of all particulate fillers, lamellar fillers and/or exfoliable or non-exfoliable nanofillers such as alumina, carbon black, clays, montmorillonites, zirconium phosphate, kaolin, calcium carbonate, diatomaceous earths, graphite, mica, silica, titanium dioxide, zeolites, talc, wollastonite, polymeric fillers such as, for example, dimethacrylate particles, glass beads or glass powder.

It is entirely possible, according to the invention, for the composition to comprise several types of reinforcing fillers. Preferentially, the filler most widely used may be glass fibers, of the chopped type, in particular having a diameter of between 7 and 14 µm. These fillers may have a surface sizing which ensures mechanical adhesion between the fibers and the polyamide matrix, in particular under critical environmental conditions, such as, for example, in contact with engine fluids.

The composition may in particular comprise from 20% to 60% by weight of reinforcing filler, relative to the total weight of the composition.

The composition may comprise, in addition to the polyamides mentioned above, one or more other polymers, preferably polyamides or copolyamides.

The present invention also relates to a process for the production of a polyamide composition in which the (co)polyamide a) and the (co)polyamide b) as indicated above are blended together. In particular, it is possible to blend the (co)polyamide a) and the (co)polyamide b) as indicated above, and optionally from 0 to 90% by weight, relative to the total weight of the composition, of reinforcing fillers; and then said blend is melted.

The polyamide composition according to the present invention can be prepared in an entirely customary manner, in a manner similar to the preparation of conventional thermoplastic compositions. The process is carried out at more or less high temperature, and at more or less high shear force depending on the nature of the various compounds. The compounds can be introduced simultaneously or successively. An extrusion device in which the material is heated, subjected to a shear force and conveyed along, is generally used. Such devices are entirely known to those skilled in the art.

According to a first embodiment, all the compounds are melt blended during a single operation, for example during an extrusion operation. It is, for example, possible to blend granules of the polymeric materials, and to introduce them into the extrusion device in order to melt them and to subject them to a greater or lesser shear stress.

It is possible, according to particular embodiments, to produce molten or non-molten premixes of some of the compounds before preparation of the final composition.

The composition according to the invention, when it is prepared using an extrusion device, is preferably conditioned in the form of granules. The granules are intended to be formed using processes that involve melting in order to obtain articles. The articles are thus constituted of the composition. According to one customary embodiment, the modified polyamide is extruded in the form of rods, for example in a twin-screw extrusion device, which rods are then cut up into granules. The molded parts are then produced by melting the granules produced above and feeding the composition in the molten state into forming devices, in particular injection-molding devices.

The (co)polyamides a) and b) can in particular be melt blended, with a greater or lesser shear stress, in particular in an extruder. The (co)polyamides a) and b) can also be cold blended, in particular in a mechanical blender, so as to be sequentially melted at the same time.

The resulting final polyamide matrix of the blend of polyamides a) and b) preferentially has an Mn of between 9000 and 25 000 g/mol, more preferentially between 10 000 and 22 000 g/mol.

In particular, a composition having an apparent melt viscosity, in Pa·s, according to the following relationships:

$$\eta 100 \leq 9(X)+20$$

$$\eta 1000 \leq 3(X)+60$$

is preferred.

The composition according to the invention may also comprise additives normally used for the production of polyamide compositions. Thus, mention may be made of lubricants, flame retardants, plasticizers, nucleating agents, impact modifiers, catalysts, light and/or heat stabilizers, antioxidants, antistatic agents, dyes, mattifying agents, molding aids or other conventional additives.

These fillers and additives may be added to the modified polyamide via usual means suitable for each filler or additive, for instance during the polymerization or by melt blending.

The composition according to the invention may be used for any plastic forming process, such as, for example, the injection-molding process. The present invention thus also relates to an injection-molding process in which a composition according to the invention is introduced into an injection-molding device and the molding operation is carried out.

The use of the compositions according to the invention is particularly advantageous within the context of the production of articles for the motor vehicle or electrical industry, in particular for the molding of parts that are fine, of large size and/or have complex geometry, such as, for example, car fenders or circuit breakers.

Specific terms are used in the description so as to facilitate the understanding of the principle of the invention. It should nevertheless be understood that no limitation of the scope of the invention is envisioned by the use of these specific terms. The term "and/or" includes the meanings and, or, and also all the other possible combinations of the elements connected to this term.

Other details or advantages of the invention will appear more clearly in light of the examples below, given only by way of indication.

EXPERIMENTAL SECTION

The compounds used are the following:

PA1: polyamide 66 having an MFI of 4.5 g/10 minutes (according to Standard ISO1133 measured at 275° C., under a load of 325 g) and a VN (viscosity number) of 140 ml/g (according to Standard ISO 307). Contents of the following terminal groups: TAG=40 meq/kg, TCG=70 meq/kg. Mn=18 200 g/mol (calculated on the basis of the terminal group values).

PA2: polyamide 66 having an MFI of 20 g/10 minutes and a VN of 105 ml/g. Contents of the following terminal groups: TAG=37 meq/kg, TCG=95 meq/kg. Obtained by addition, at the start of polymerization, of 0.4 mol % of acetic acid. Mn=12 500 g/mol (calculated on the basis of the terminal group values).

PA3: polyamide 6 having an MFI of 7 g/10 minutes and a VN of 150 ml/g. Contents of the following terminal groups: TAG=39 meq/kg, TCG=51 meq/kg. Mn 22 200 g/mol (calculated on the basis of the terminal group values).

PA4: polyamide 6 having an MFI of 2 g/10 minutes and a VN of 200 ml/g. Contents of the following terminal groups: TAG=41 meq/kg, TCG=40 meq/kg. Mn=25 000 g/mol (calculated on the basis of the terminal group values).

Glass fibers: Vetrotex 995.

Additives: EBS wax, and nigrosine sold under the name 54/1033 by the company Ferroplast, and also CuI and KI stabilizers.

The compositions are prepared by melt blending, using a Werner and Pfleiderer ZSK twin-screw extruder, polyamides, 30% by weight of glass fibers and 1.5% by weight of additives. The extrusion conditions are the following: temperature: between 240 and 280° C., rotation speed: between 200 and 300 rpm, throughput: between 25 and 60 kg/hour.

The capillary rheometer analysis was carried out according to Standard ISO 11443 on dry granules using a Göttfert Rheograph 2002 rheometer, with in particular a transducer of 1000 bar, a Roundhole type capillary of 30 mm×1 mm in diameter, with a piston of 12 mm in diameter and a speed (mm/sec): 0.01; 0.02; 0.05; 0.1; 0.2; 0.5; 1.0; 2.0; 5.0.

The ash content is measured according to Standard ISO 3451/1A, 30 min at 750° C.

The tensile strength is measured according to Standard ISO 527. The Charpy unnotched impact strength is measured according to Standard ISO 179/1eU.

The spiral test makes it possible to quantify the fluidity of the compositions by melting the granules and injecting them into a spiral-shaped mold having a rectangular cross section with a thickness of 2 mm and a width of 4 cm, in a BM-Biraghi 85T press at a barrel temperature of 275° C., a mold temperature of 80° C. and with a maximum injection pressure of 130 bar hydraulic, which corresponds to an injection time of approximately 0.4 seconds. The result is expressed as the length of mold correctly filled by the composition.

The results are mentioned in table 1:

TABLE 1

| COMPOSITIONS | C1 | C2 | 1 | 2 |
|---|---|---|---|---|
| PA 1 | 68.5 | — | — | — |
| PA 2 | — | 68.5 | 61.5 | 61.5 |
| PA 3 | — | — | 7 | — |

TABLE 1-continued

| COMPOSITIONS | C1 | C2 | 1 | 2 |
|---|---|---|---|---|
| PA 4 | — | — | — | 7 |
| Additives | 1.5 | 1.5 | 1.5 | 1.5 |
| Glass fibers | 30 | 30 | 30 | 30 |
| Total | 100 | 100 | 100 | 100 |
| Ash content (%) | 29.9 | 30.0 | 30.2 | 30.0 |
| PA66/PA6 viscosity ratio | // | // | 0.70 | 0.52 |
| VN ISO 307 (ml/g) | 145 | 116 | 117 | 117 |
| Notched Charpy (KJ/m$^2$) | 10.9 | 11.2 | 11.2 | 11.2 |
| Unnotched Charpy (KJ/m$^2$) | 79.5 | 61.5 | 69.4 | 74.2 |
| Tensile strength (N/mm$^2$) | 192 | 186 | 190 | 190 |
| Tensile elongation (%) | 3.4 | 2.7 | 3.1 | 3.1 |
| Tensile modulus (N/mm$^2$) | 9820 | 9450 | 9920 | 10 200 |
| $\eta$(100 s$^{-1}$) | 510 | 293 | 283 | 262 |
| $\eta$(1000 s$^{-1}$) | 242 | 132 | 140 | 145 |
| Spiral test (cm) | 27 | 39 | 39 | 39 |
| Surface appearance | medium | good | good | good |

The tests C1 and C2 are used by way of comparison.

It is noted, entirely unexpectedly, that tests 1 and 2 according to the invention exhibit a much better balance between rheological properties and mechanical properties compared with the standard composition C1 and the comparative test composition C2.

The invention claimed is:

1. A composition comprising a blend of:
   a) a (co)polyamide a) of type 66 comprising at least 90 mol % of adipic acid and hexamethylenediamine monomer residues, said (co)polyamide a) having an Mn of 8,000 to 14,000 g/mol;
   b) a (co)polyamide b) of type 6, said (co)polyamide b) comprising at least 90 mol % of caprolactam monomer residues and having an Mn of 25,000 to 30,000 g/mol; and
   c) 0% to 40% by weight, relative to the total weight of the composition, of reinforcing fillers; and
   d) optionally, one or more additives;
   wherein the (co)polyamide a) and the (co)polyamide b) form a polyamide matrix comprising 80% to 95% by weight of the (co)polyamide a) of type 66, relative to the total weight of the polyamide matrix, and 5% to 20% of the (co)polyamide b) of type 6, relative to the total weight of the polyamide matrix;
   wherein the total weight of the composition is the sum of the weights of the polyamide matrix formed by: the (co)polyamides a) and b), the reinforcing fillers c), and the optional one or more additives d);
   wherein the ratio of the viscosities in solution, measured according to Standard ISO 307 in formic acid, of the (co)polyamide a) relative to the (co)polyamide b) is between 0.3 and 0.8;
   said composition having an apparent melt viscosity, in Pa·s, according to the following relationships:

$$\eta 100 \leq 8(X)+100$$

$$\eta 1000 \leq 3(X)+90$$

in which $\eta$ is the apparent melt viscosity of the polyamide composition measured at a temperature of 275° C.; either at a shear rate of 100 s$^{-1}$, $\eta$100, or at a shear rate of 1000 s$^{-1}$, $\eta$1000; and X corresponds to the proportion by weight of reinforcing fillers, relative to the total weight of the composition; and
   the apparent melt viscosity is measured according to Standard ISO 11443.

2. The composition of claim 1, wherein the ratio of the viscosities in solution, measured according to Standard ISO 307 in formic acid, of the (co)polyamide a) relative to the (co)polyamide b) is between 0.5 and 0.6.

3. The composition of claim 1, wherein the reinforcing fillers c) are selected from the group consisting of: fibrous fillers, non-fibrous fillers, exfoliable or nonexfoliable nanofillers, polymeric fillers, glass beads and glass powder.

4. The composition of claim 1, wherein said one or more additives d) are selected from the group consisting of: lubricants, flame retardants, plasticizers, nucleating agents, impact modifiers, catalysts, light stabilizers, heat stabilizers, antioxidants, antistatic agents, dyes, mattifying agents and molding aids.

5. The composition of claim 1, wherein the resulting polyamide matrix of the blend of the polyamides a) and b) has an Mn of 9,000 and 25,000 g/mol.

6. A process for the production of a composition of claim 1, the process comprising blending at least the (co)polyamide a) and the (co)polyamide b).

7. An article obtained by forming the composition of claim 1.

8. The composition of claim 1, wherein the fibrous fillers are selected from the group consisting of glass fibers, carbon fibers, natural fibers and nanotubes, the non-fibrous fillers are particulate fillers and/or, lamellar fillers, the exfoliable or nonexfoliable nanofillers are selected from the group consisting of alumina, carbon black, clays, montmorillonites, zirconium phosphate, kaolin, calcium carbonate, diatomaceous earths, graphite, mica, silica, titanium dioxide, zeolites, talc, and wollastonite, and the polymeric filler comprises dimethacrylate particles.

9. The composition of claim 1, wherein the (co)polyamide a) has an Mn of 8,000 to 12,500 g/mol.

10. The composition of claim 1, wherein the (co)polyamide a) has an Mn of 8,000 to 10,000 g/mol.

11. The composition of claim 1, wherein the (co)polyamide a) has an Mn of 12,500 g/mol.

12. The composition of claim 1, wherein the (co)polyamide a) has an Mn of 10,000 g/mol.

* * * * *